US012804002B2

(12) United States Patent
Kaye et al.

(10) Patent No.: US 12,804,002 B2
(45) **Date of Patent: *Nov. 17, 2026**

(54) DETECTING DATA EXFILTRATION AND COMPROMISED USER ACCOUNTS IN A COMPUTING NETWORK

(71) Applicant: Bank of America Corporation, Charlotte, NC (US)

(72) Inventors: Kenneth A. Kaye, Highlands Ranch, CO (US); Nikhil Sanil, Tega Cay, SC (US); Dipika Joshi, Waxhaw, NC (US); Colin Murphy, Charlotte, NC (US); Satyanarayana R. Mandapati, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 75 days.

This patent is subject to a terminal disclaimer.

(21) Appl. No.: 18/911,633

(22) Filed: Oct. 10, 2024

(65) Prior Publication Data

US 2025/0039209 A1 Jan. 30, 2025

Related U.S. Application Data

(63) Continuation of application No. 17/317,386, filed on May 11, 2021, now Pat. No. 12,166,780.

(51) Int. Cl.

| | |
|---|---|
| ***H04L 9/40*** | (2022.01) |
| ***G06F 16/22*** | (2019.01) |
| ***G06F 16/28*** | (2019.01) |

(52) U.S. Cl.
CPC .......... *H04L 63/1425* (2013.01); *G06F 16/22* (2019.01); *G06F 16/285* (2019.01); *H04L 63/1441* (2013.01)

(58) Field of Classification Search
CPC .... G06F 16/22; G06F 16/285; G06F 16/9535; H04L 63/1425; H04L 63/1441; H04L 63/102
See application file for complete search history.

(56) References Cited

U.S. PATENT DOCUMENTS

| | | | |
|---|---|---|---|
| 7,636,713 | B2 | 12/2009 | Jadhav |
| 8,443,011 | B2 | 5/2013 | Kandlikar et al. |
| 8,533,825 | B1 | 9/2013 | Marsa et al. |
| 8,818,918 | B2 | 8/2014 | Lin et al. |
| 9,356,846 | B2 | 5/2016 | Cremonesi et al. |
| 9,503,467 | B2 | 11/2016 | Lefebvre et al. |
| 9,984,241 | B2 | 5/2018 | Jin |
| 10,404,732 | B2 | 9/2019 | Munro et al. |
| 10,505,954 | B2 | 12/2019 | Stokes, III et al. |
| 10,885,167 | B1 | 1/2021 | Lador et al. |
| 10,986,110 | B2 | 4/2021 | Dodson et al. |

(Continued)

*Primary Examiner* — Amir Mehrmanesh
*Assistant Examiner* — Thomas A Gyorfi
(74) *Attorney, Agent, or Firm* — Banner & Witcoff, Ltd.

(57) ABSTRACT

Aspects of the disclosure relate to monitoring a computing network to determine data exfiltration. A computing platform may use time-series modeling to determine anomalous network activity with respect to outgoing data. Additional aspects of this disclosure relate to analysis of web activities associated with a user to determine compromised user accounts/devices. The computing platform may use domain categorization to determine if web activity associated with a user is anomalous.

20 Claims, 9 Drawing Sheets

100

(56) References Cited

U.S. PATENT DOCUMENTS

| | | | |
|---|---|---|---|
| 12,166,780 | B2 * | 12/2024 | Kaye .................. H04L 63/1425 |
| 2014/0165207 | A1 | 6/2014 | Engel et al. |
| 2016/0099963 | A1 | 4/2016 | Mahaffey et al. |
| 2017/0063909 | A1 | 3/2017 | Muddu et al. |
| 2018/0020015 | A1 | 1/2018 | Munro et al. |
| 2018/0027004 | A1 | 1/2018 | Huang et al. |
| 2018/0196942 | A1 | 7/2018 | Kashyap et al. |
| 2018/0316571 | A1 | 11/2018 | Andrade et al. |
| 2018/0367551 | A1 | 12/2018 | Muddu et al. |
| 2019/0007285 | A1 | 1/2019 | Nevo et al. |
| 2019/0362245 | A1 | 11/2019 | Buda et al. |
| 2020/0210393 | A1 | 7/2020 | Beaver et al. |
| 2021/0136097 | A1 | 5/2021 | McClymont, Jr. |
| 2021/0194907 | A1 | 6/2021 | Bertiger et al. |
| 2021/0367875 | A1 | 11/2021 | Yamashita |
| 2021/0390625 | A1 | 12/2021 | Hayes et al. |
| 2022/0188690 | A1 | 6/2022 | Rawat et al. |
| 2023/0185579 | A1 | 6/2023 | Eranpurwala et al. |

* cited by examiner

Day 1

| Category | Hits | Threshold | Anomaly |
|---|---|---|---|
| Coding | 163 | 654 | No |
| News | 17 | 87 | No |
| Law | 2 | 7 | No |
| Finance | 9 | 28 | No |
| Social | 0 | 0 | No |

Day 2

| Category | Hits | Threshold | Anomaly |
|---|---|---|---|
| Coding | 163 | 654 | No |
| News | 17 | 87 | No |
| Law | 2 | 7 | No |
| Finance | 934 | 28 | Yes |
| Social | 0 | 0 | No |

DETECTING DATA EXFILTRATION AND COMPROMISED USER ACCOUNTS IN A COMPUTING NETWORK

CROSS-REFERENCE TO RELATED APPLICATIONS

This application is a continuation of U.S. patent application Ser. No. 17/317,386, filed May 11, 2021 which is hereby incorporated by reference in its entirety.

FIELD

Aspects described herein generally relate to the field of cybersecurity, and more specifically to monitoring a communication network by analyzing network traffic and user activity.

BACKGROUND

Monitoring data traffic to detect unauthorized data exfiltration from a computing network (e.g., a private computing network) is a common approach for detecting potentially malicious activity. For example, an enterprise organization may use systems that scan data outgoing from their private networks to determine if it is unauthorized or potentially malicious. However, this approach may be extremely resource intensive, thereby making it unsuitable for large networks (e.g., comprising hundreds or thousands of connected devices).

Another issue in computing networks is detection of unauthorized access to a user device or a user account associated with a computing network. Detection of compromised access to a user device or a user device is generally based on static triggers. For example, a computing network may determine unauthorized access based on repeated failed logins to a user account, use of different locations/internet protocol (IP) addresses for login attempts, etc. Such static approaches can be easily circumvented by a malicious actor.

SUMMARY

Aspects of the disclosure provide solutions that address and overcome technical problems associated with network security. In particular, one or more aspects of the disclosure relate to detection of data exfiltration based on time-series forecasting approaches. Additional aspects of this disclosure relate to detection of unauthorized access to a user account/user device based on modeling of web browsing activity.

In accordance with one or more arrangements, system may be used for detecting and blocking data exfiltration, from a user device, associated with a computing network, to an external network. The user device may be configured to send data to one or more devices in the computing network and the external network. The system may comprise a network monitoring platform that is communicatively coupled to the user device and the external network. The network monitoring platform may comprise at least one processor, a communication interface communicatively coupled to the at least one processor, and memory storing computer-readable instructions. The computer-readable instructions, when executed by the at least one processor, may cause the network monitoring platform to perform one or more operations described herein. The network monitoring platform may monitor outgoing data from the user device to the external network. The network monitoring platform may predict, based on a seasonal autoregressive integrated moving average (SARIMA) model of data volumes, expected data volumes of outgoing data for a first set of time intervals. Further, the network monitoring platform may measure data volumes of outgoing data for the first set of time intervals without inspecting content of the outgoing data for the first set of time intervals. Based on the expected data volumes for the first set of time intervals and the measured data volumes for the first set of time intervals, the network monitoring platform may identify anomalies in the measured data volumes of outgoing data for the first set of time intervals. The network monitoring platform may send, via the communication interface and based on the identification of anomalies, a notification to disconnect the user device. Disconnecting the user device may comprises blocking outgoing data from the user device to the external network.

In an arrangement, the network monitoring platform may measure data volumes of outgoing data for a second set of time intervals. The network monitoring platform may build, based on the measured data volumes for the second set of time intervals, the SARIMA model of data volumes.

In an arrangement, building the SARIMA model of data volumes may comprise determining one or more hyperparameters of the SARIMA model that result in a best fit between the measured data volumes of outgoing data for the second set of time intervals and expected data volumes of outgoing data for the second set of time intervals. The expected data volumes of outgoing data for the second set of time intervals may be determined based on the SARIMA model.

In an arrangement, identifying the anomalies may be based on a difference between a measured data volume and an expected data volume for a time interval in the first set being greater than a threshold value. The threshold value may be a multiple of a standard deviation of the expected data volumes for the first set of time intervals. The threshold value may be a multiple of a standard deviation of differences between the expected data volumes and the measured data volumes for the first set of time intervals. In an arrangement, the network monitoring platform may send, via the communication interface and based on the identification of anomalies, an alert notification to another user device.

In accordance with one or more arrangements, system may be used for detecting and blocking data exfiltration, from a user device, associated with a computing network, to an external network. The system may comprise the external network comprising a malicious actor device; the user device communicatively coupled to the external network and configured to send data over the computing network to at least the malicious actor device; and a network monitoring platform on the computing network, communicatively coupled to the user device and the external network. The network monitoring platform may comprise a processor, a communication interface communicatively coupled to the processor, and one or more memories comprising a user profile database and storing computer-readable instructions that, when executed by the processor, cause the network monitoring platform to perform one or more operations. The network monitoring platform may monitor outgoing data from the user device to the external network. The network monitoring platform may count, in the outgoing data for a first time period, an actual quantity of requests by the user device to domains associated within a domain category without inspecting webpage content at the domains. The network monitoring platform may predict, based on a user profile associated with the user device that is stored in the user profile database, expected quantity of requests to the domain category by the user device for the first time period. The network monitoring platform may, for the first time period, based on the expected quantity of requests and the actual quantity of requests, identify anomalies in the outgoing data of the user device classified in the domain category. The network monitoring platform may send, via the communication interface and based on the identified anomalies, a notification to disconnect the user device. Disconnecting the user device may comprise blocking the outgoing data from the user device to the external network. Identifying of the anomalies, by the network monitoring platform, may be based on at least one of deviation from a mean, deviation exceeding a multiple of a standard deviation, and/or deviation from an upper or lower limit of an interquartile range.

In an arrangement, the network monitoring platform may classify requests in the outgoing data from the user device to the external network into one of a plurality of domain categories, wherein the outgoing data extends for a plurality of time periods including the first time period. The network monitoring platform may build a statistical model based on the classifying of the requests, wherein the statistical model comprises at least one of: an average quantity of requests per a time period, a standard deviation of a quantity of requests per the time period, an interquartile range of a quantity of requests per the time period, or combination thereof. The network monitoring platform may update the user profile, which is stored in the user profile database, associated with the user device based on the statistical model.

In an arrangement, the building of the statistical model may comprise, for the plurality of time periods, monitoring Internet website browsing patterns of a user of the user device by domain category without inspecting webpage content from the external network. The network monitoring platform may calculate, for each of the plurality of time periods, a respective quantity of requests to each of a plurality of domain categories. The plurality of domain categories may be seventy-three categories. The building of the statistical model may comprise determining one or more hyperparameters of the statistical model that result in a best fit.

In an arrangement, the requests in the outgoing data from the user device may represent Internet website browsing patterns of a user of the user device.

In an arrangement, sending the notification to disconnect the user device may comprise determining an anomaly score associated with the identified anomalies, wherein the anomaly score is based on a difference between the expected quantity of requests and the actual quantity of requests. The network monitoring platform may send the notification to disconnect the user device based on the anomaly score exceeding a threshold score.

In an arrangement, sending the notification to disconnect the user device may comprise sending the notification to a gateway server associated with the user device.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
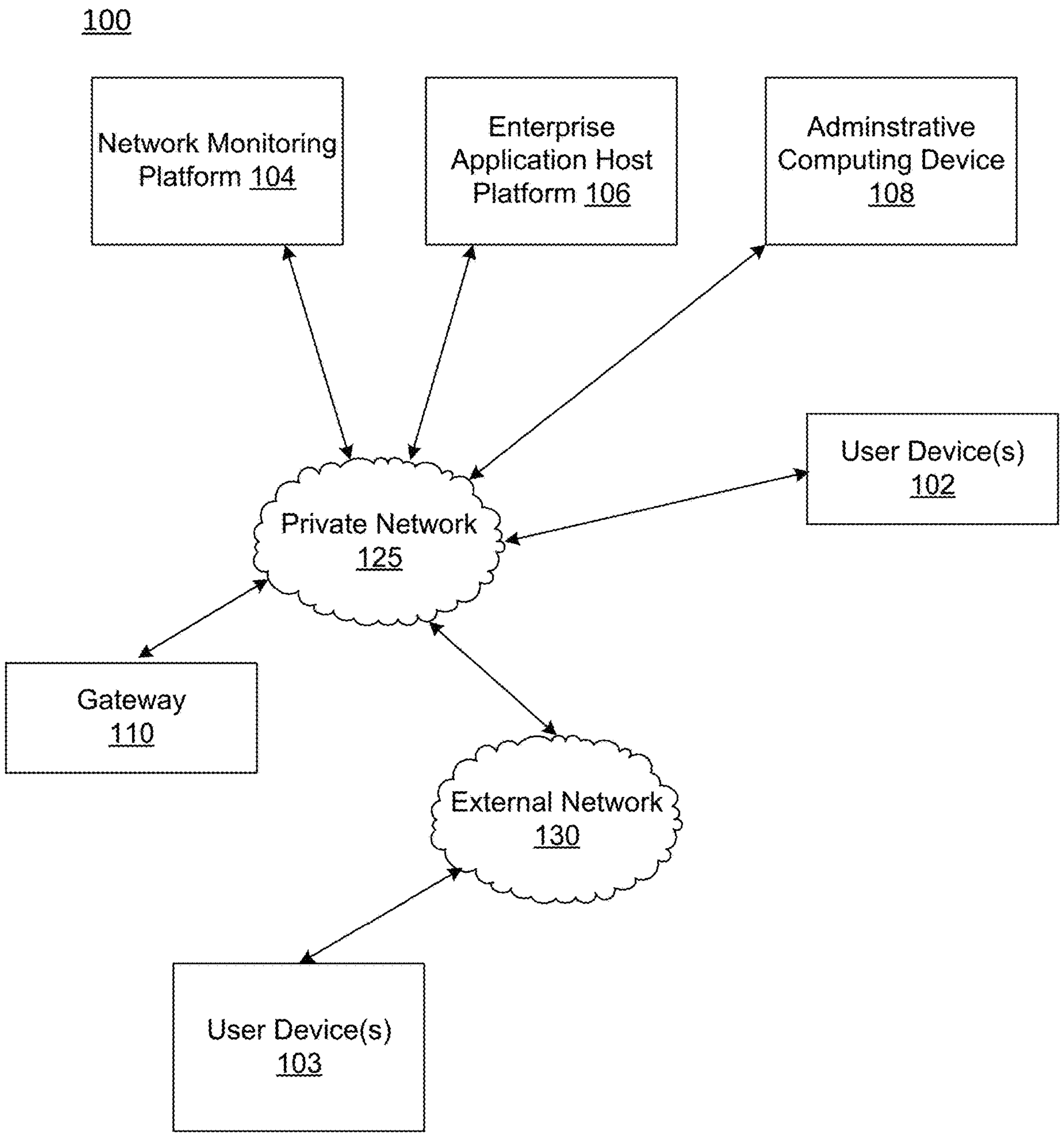
FIG. 1A shows an illustrative computing environment for network monitoring and control, in accordance with one or more example arrangements.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

A computing network (e.g., associated with an enterprise organization) may comprise multiple user devices that may communicate with each other (or to external networks). Users associated with the user devices may be employees of the enterprise organization or authorized external users that can connect to the network to access various services. For example, the computing network may be associated with a financial institution (such as a bank). External users may connect to computing resources within the network to access various banking services.

Malicious actors may obtain unauthorized access to devices in the computing network and use this to retrieve confidential data and send/exfiltrate to data to external devices. While many tools exist to scan data outgoing from the network (e.g., to determine if data is confidential and not authorized for export to external networks), this approach may be extremely resource intensive for large networks. Data exfiltration may be detected based on analyzing traffic volume associated with a user device/user account within the computing network. Merely using traffic volume avoids the necessity of content inspection and reduces resource usage. However, this approach may lead to detection of false positives or false negatives at an unacceptable rate. For example, a static threshold of traffic volume may be used to detect data exfiltration from the user devices. Different user devices may be associated with different functions within the computing network. Some user devices may send large quantities of data to external networks as part of normal operations. Other devices may normally send minimal quantities of data to the external networks. Using a same threshold for all devices may result in detection of false positives or false negatives. For example, the monitoring tool may detect that a user device that generally sends large quantities of outgoing data as part of normal operations is performing malicious activity.

Further, approaches that use static data volumes as thresholds do not account for trends, seasonality, randomness, or other factors that may affect volumes of outgoing data. Outgoing data from a user device may shows variations based on, for example, a day of the week. A static threshold does not account for this variation and may result in detection of a false positive even though higher data may be due to a seasonal variation and part of normal operations.

Various examples described herein determine data exfiltration based on customized time-series models for user devices. The time series models may be used to determine expected data volumes for a set of time intervals. The actual data volumes for the set of time intervals may then be compared with the expected data volumes to determine anomalous network activity. The use of customized models for different user devices enable the system to account for difference in network activity among the different user devices. Further, the use of time-series models enables the system to account for seasonal variations and trends in network activity. These factors advantageously reduce detection of false positives and false negatives. Anomalies in training data used to generate time-series models may impact accuracy of predictions. Various aspects of this disclosure further relate to identifying outliers in the training data, and replacing the outliers with corrected values to generate a more accurate model prediction.

Malicious actors may use various actor vectors (e.g., compromised passwords, brute-force attacks, malware injection, man-in-the-middle attack) to gain control of user devices (or user accounts) associated with a computing network of an enterprise organization. For example, a user may be an employee of the organization or a client associated with the organization. For example, the enterprise organization may be a financial institution, and a malicious actor may gain access to a user banking account and initiate unauthorized fund transfers. As another example, a malicious actor may gain access to internal systems/databases associated with the financial institution and retrieve confidential information.

Detection of such attacks may generally be based on static triggers. For example, a monitoring tool may detect a potential attack based on a quantity of attempted logins to a user account. Another method may be to determine if the attempted logins are from different locations. However, malicious actors are generally wary of these security mechanisms and may employ techniques to avoid detection.

Various examples herein describe detecting unauthorized access to a user account and/or a user device based on distribution analysis of web activity associated with the user account and/or user device. A monitoring platform may track web activity of a user account and categorize the domains accessed by the user into domain categories. The monitoring platform may determine a statistical model of user activity associated with each of the domain categories. The statistical model may then be used to analyze future browsing activity to determine if it is anomalous. Tracking user web activity via domain categories rather than individual domains reduces the resources (e.g., server time, processing/memory resources) required for detecting unauthorized access to a user account.

A sequence of data volumes of outgoing data from a user device, in consecutive time intervals, may be considered to be a time series and time series forecasting approaches may be used to predict future data volumes. A time series forecasting approach comprises building a time series model based on historical values of the sequence (e.g., training values) and using the model to predict future values of the sequence.

FIG. 1A shows an illustrative computing environment 100 for network monitoring, in accordance with one or more arrangements. The computing environment 100 may comprise one or more devices (e.g., computer systems, communication devices, and the like). The computing environment 100 may comprise, for example, a network monitoring platform 104, an enterprise application host platform 106, an enterprise user computing device 108, a gateway 110, and/or one or more user devices 102. The one or more of the devices and/or systems, may be linked over a private network 125 associated with an enterprise organization (e.g., a financial institution). The computing environment 100 may additionally comprise one or more user devices 103 connected, via an external network 130 (e.g., a public network), to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a 3$^{rd}$ Generation Partnership Project (3GPP) cellular protocol, a hypertext transfer protocol (HTTP), etc.).

The network monitoring platform 104 may comprise one or more computing devices and/or other computer components (e.g., processors, memories, communication interfaces) configured to perform one or more functions as described herein. Further details associated with the architecture of the network monitoring platform 104 are described with reference to FIG. 1A.

The enterprise application host platform 106 may comprise one or more computing devices and/or other computer components (e.g., processors, memories, communication interfaces). In addition, the enterprise application host platform 106 may be configured to host, execute, and/or otherwise provide one or more enterprise applications. With reference to the example where the private network 125 is associated with a financial institution, the enterprise application host platform 106 may be configured to host, execute, and/or otherwise provide one or more transaction processing programs, such as an online banking application, fund transfer applications, and/or other programs/applications associated with the financial institution. The enterprise application host platform 106 may comprise various servers and/or databases that store and/or otherwise maintain account information, such as financial account information including account balances, transaction history, account owner information, and/or other information. In addition, the enterprise application host platform 106 may process and/or otherwise execute transactions on specific accounts based on commands and/or other information received from other computer systems comprising the computing environment 800.

The administrative computing device 108 may be a personal computing device (e.g., desktop computer, laptop computer) or mobile computing device (e.g., smartphone, tablet) associated with user who may have administrative privileges within the private network. For example, the administrative computing device 108 may be used to monitor the operation of and provide commands for execution at the network monitoring platform and/or the gateway 110.

The user device 102 may be a personal computing device (e.g., desktop computer, laptop computer) or mobile computing device (e.g., smartphone, tablet). In addition, the user device 102 may be linked to and/or operated by a specific enterprise user (who may, for example, be an employee or other affiliate of the enterprise organization). While FIG. 1A shows only a single user device, it may be understood that the private network 125 may comprise a plurality of user devices 102 that may access the various servers, applications, and/or databases in the private network 125 and/or communicate with servers/device via the external network 130.

The gateway 110 may comprise a server that controls access of devices in the private network 125 to the external network 130. The gateway 110 may act as an intermediary for communications associated with devices, connected in the private network 125, and the external network 130.

The user device 103 may be a computing device (e.g., desktop computer, laptop computer) or mobile computing device (e.g., smartphone, tablet) connected to the external network 130. The user device 103 may be configured to enable the user to access the various functionalities provided by the devices, applications, and/or systems in the private network 125 via the external network 130. While FIG. 1A shows only a single user device in the external network 130, it may be understood that the external network 130 may comprise a plurality of user devices 103 that may access various servers, applications, and/or databases in the private network 125 and/or communicate with servers/device via the external network 130.

In one or more arrangements, the network monitoring platform 104, the enterprise application host platform 106, the enterprise user computing device 108, the gateway 110, and/or the one or more user devices 102/103, and/or the other devices/systems in the computing environment 100 may be any type of computing device capable of receiving input via a user interface, and communicating the received input to one or more other computing devices in the computing environment 100. For example, the network monitoring platform 104, the enterprise application host platform 106, the enterprise user computing device 108, the gateway 110, and/or the one or more user devices 102/103, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the network monitoring platform 104, the enterprise application host platform 106, the enterprise user computing device 108, the gateway 110, and/or the one or more user devices 102/103, and/or the other devices/systems in the computing environment 100 may, in some instances, be and/or comprise special-purpose computing devices configured to perform specific functions.

Figure 1B:
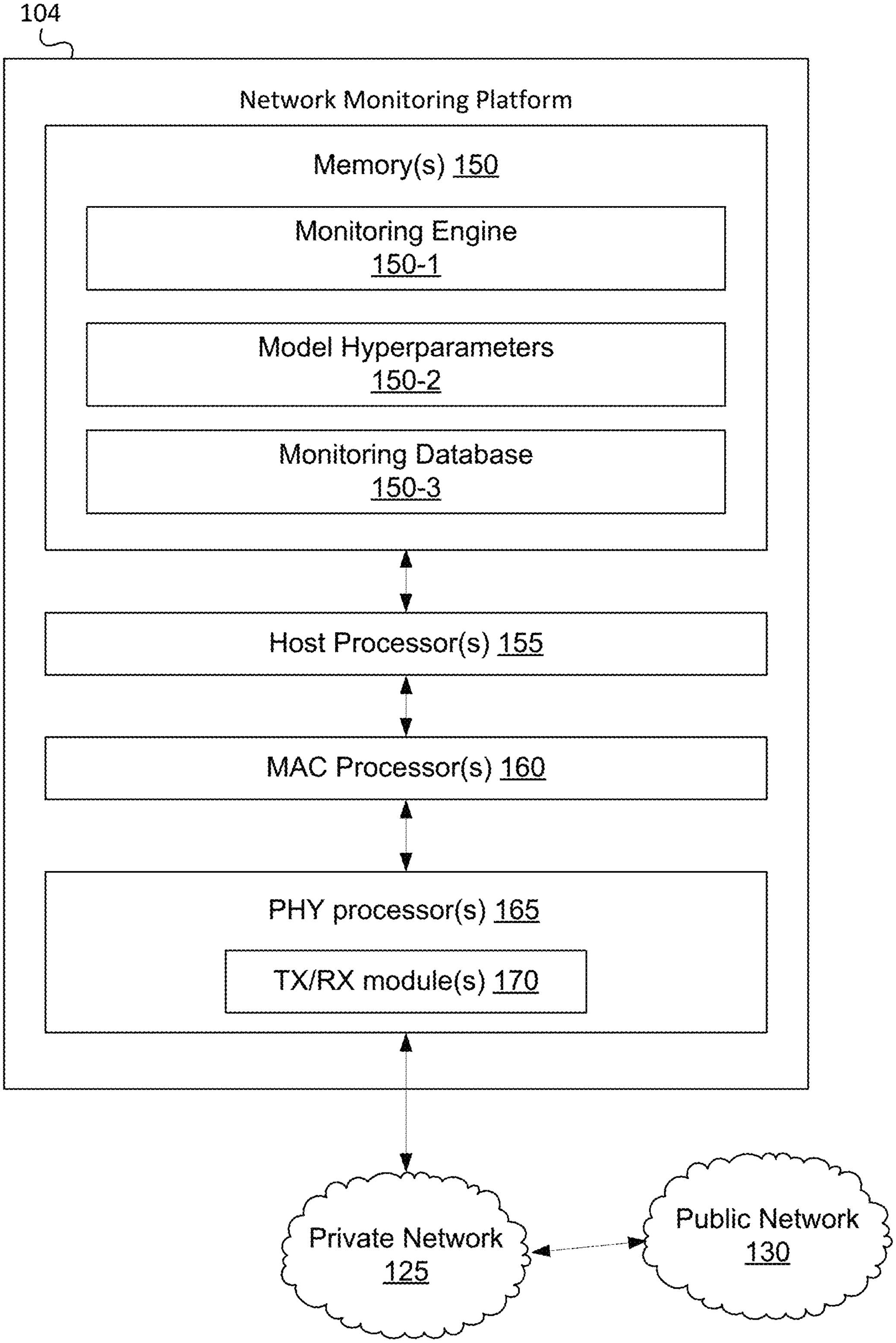
FIG. 1B shows an example network monitoring platform, in accordance with one or more example arrangements.

FIG. 1B shows an example network monitoring platform 104 in accordance with one or more examples described herein. The network monitoring platform 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The network monitoring platform 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. Memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor (s) 160 and/or the PHY processor(s) 165 of the network monitoring platform 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the network monitoring platform 104 may be configured to execute machine readable instructions stored in memory 150. The memory 150 may comprise (i) one or more program modules/engines having instructions that when executed by the one or more processors cause the network monitoring platform 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the network monitoring platform 104 and/or by different computing devices that may form and/or otherwise make up the network monitoring platform 104. For example, the memory 150 may have, store, and/or comprise the monitoring engine 150-1, the model hyperparameters 150-2 (e.g., hyperparameters associated with a determined time series models as described herein), and/or the monitoring database 150-3. The monitoring engine 150-1 may have instructions that direct and/or cause the network monitoring platform 104 to perform one or more operations of the network monitoring platform 104 as discussed herein. The monitoring database 150-3 may store information corresponding to web activity associated with users in the computing environment 100 categorized into domain categories.

While FIG. 1A illustrates the network monitoring platform 104, the enterprise application host platform 106, the enterprise user computing device 108, the gateway 110, and/or the user device 120 as being separate elements connected in the private network 125, in one or more other arrangements, functions of one or more of the above may be integrated in a single device/network of devices. For example, elements in the network monitoring platform 104 (e.g., host processor(s) 155, memory(s) 150, MAC processor (s) 160, PHY processor(s) 165, TX/RX module(s) 170, and/or one or more program/modules stored in memory(s) 150) may share hardware and software elements with and corresponding to, for example, the enterprise application host platform 106, the enterprise user computing device 108, or the user device 102.

As described herein, a time series model may be used to determine anomalous data traffic from user devices in the private network 125. An autoregressive integrated moving average (ARIMA) model of a time series y (e.g., a sequence of data volumes) may be represented by a model equation:

Equation (1)

$$Y_t = \alpha + (\beta_1 Y_{t-1} + \beta_2 Y_{t-2} + \ldots \beta_p Y_{t-p}) - (\theta_1 e_{t-1} - \theta_2 e_{t-2} - \ldots \theta_q e_{t-q})$$

where $(\beta_1 Y_{t-1} + \beta_2 Y_{t-2} + \ldots \beta_p Y_{t-p})$ is the autoregression (AR) component, and $(\theta_1 e_{t-1} - \theta_2 e_{t-2} - \ldots \theta_1 e_{t-q})$ is the moving average (MA) component. $Y_t$, $Y_{t-1}$, $Y_{t-2}$, . . . $Y_{t-p}$ may correspond to model fit values of the time series or the model fit values with one or more differencing transformations applied. $e_{t-1}$, $e_{t-2}$, . . . $e_{t-q}$ may correspond to errors between values of the time series y and the model fit values. Building the ARIMA model may comprise determining values of $\alpha$, $\beta_i$, and $\theta_i$ based on historical values of time series y (e.g., training values). The model equation may then be used to predict future values of the time series y.

A time series that exhibits a certain degree of periodicity with time may be said to be seasonal and a seasonal ARIMA (SARIMA) model may be used to model the time series. A SARIMA model equation may have additional terms (e.g., MA components, AR components) that apply seasonality to the ARIMA model. The additional terms may use values of Y corresponding to prior seasons in a model equation. Outgoing data volumes from a user device, for example, may exhibit a weekly periodic behavior. The SARIMA model may account for this periodicity.

Figure 2:
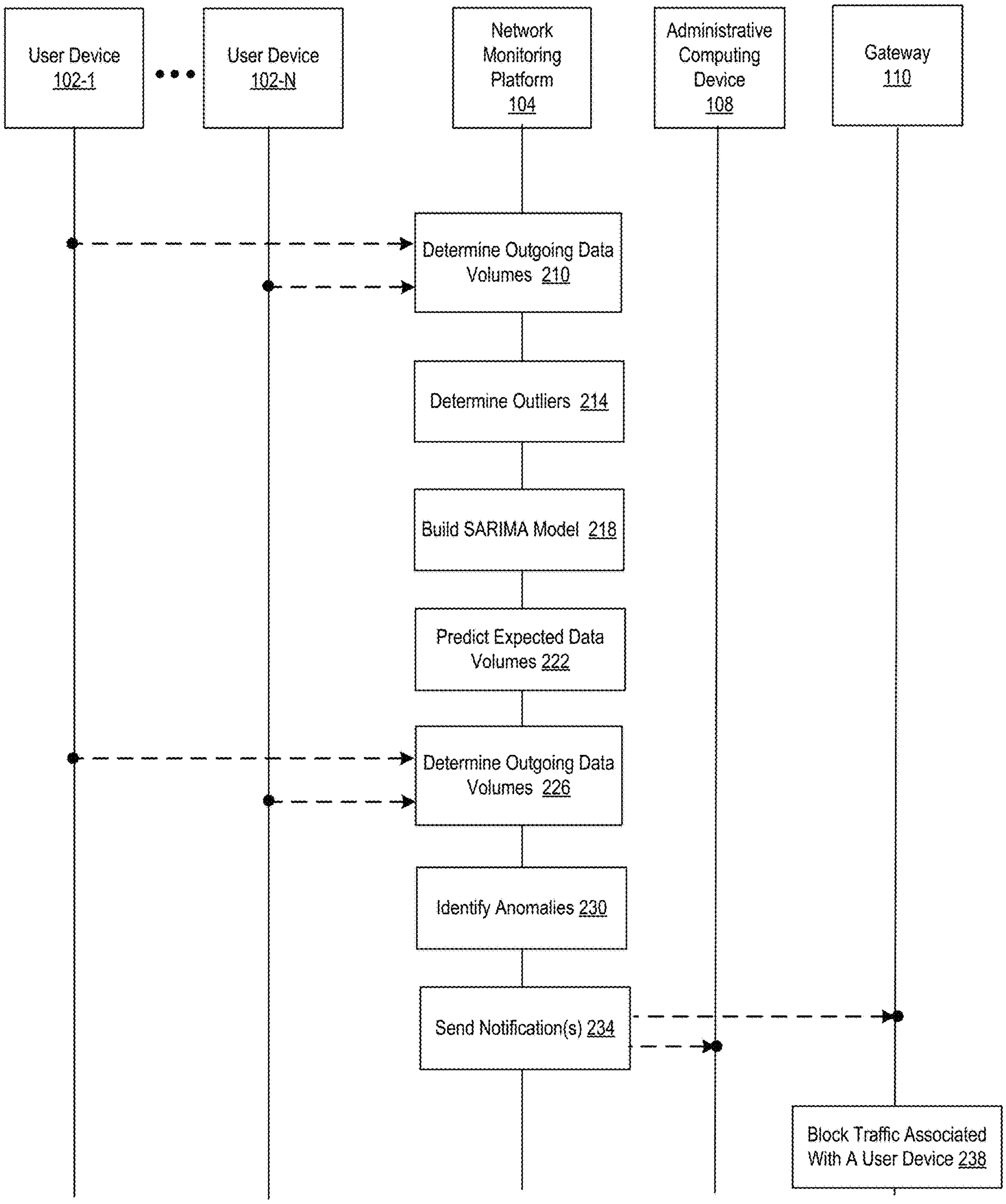
FIG. 2 shows an illustrative event sequence for building seasonal autoregressive integrated moving average (SARIMA) models of outgoing data volumes and detecting anomalies, in accordance with one or more example arrangements.

FIG. 2 shows an illustrative event sequence for building SARIMA models of outgoing data volumes and detecting anomalies, in accordance with one or more example arrangements. At step 210, a network monitoring platform 104 may determine/measure, for a first set of time intervals, data volumes of outgoing data from each user device (e.g., user device 102-1 . . . 102-N) of a plurality of user devices 102. The plurality of user devices 102 may correspond to user devices connected in the private network 125 associated with an enterprise organization. A time interval, in the first set of time intervals, may correspond to any period of time (e.g., 1 hour, 6, hours, 1 day, etc.). Outgoing data may correspond to data transmitted from a user device 102 to the external network 130. As described herein, the network monitoring platform 104 may determine SARIMA models for outgoing data volumes from each of the plurality of user devices 102.

At step 214, the network monitoring platform 104 may determine outliers in the data volumes of outgoing data from a user device 102 (e.g., as determined at step 210). The outliers may not be used for generating the SARIMA model for the user device. For example, an outlier may correspond to a data volume of 0, which may be indicative that the user device 102 was not connected to the private network 125 or the external network 130. Other approaches may be used to detect outliers. For example, an interquartile approach may be used wherein data volumes that are not in an interquartile range of data volumes may be ignored for training the SARIMA model.

At step 218, the network monitoring platform 104 may determine a SARIMA model of data volumes for the user device 102 based on the determined data volumes for the first set of time intervals. Determining the SARIMA model may comprise determining a set of hyperparameters associated with a SARIMA model equation (e.g., of $\alpha$, $\beta_i$, $\theta_i$, p, q, trend, parameters associated with a seasonal portion of the SARIMA model equation, etc.). The SARIMA model equation may account for an observed trend in the series of determined data volumes (e.g., y). The trend may be "constant" if the values of y are approximately at a same level over time (e.g., y≈c, where c is a constant). The trend may be "linear" if the values of y show a linear dependence with time (e.g., y≈at, where a is a slope and t corresponds to time intervals). Determining a set of hyperparameters for the SARIMA model equation may comprise using different sets with different combinations of values of hyperparameters, and determine which set results in generation of values that most closely fit the determined data volumes in the first set of time intervals.

At step 222, the network monitoring platform 104 may predict estimated outgoing data volumes for a second set of time intervals (e.g., time intervals different from the first set of time intervals used for building the SARIMA model) and for the user device 102. The network monitoring platform 104 may use the SARIMA model built at step 218 for predicting the estimated data volumes for the second set of time intervals.

At step 226, the network monitoring platform 104 may measure, for the second set of time intervals, actual data volumes of outgoing data from the user device 102. At step 230, the network monitoring platform 104 may, to determine anomalous activity, compare the measured data volumes for the second set of time intervals (e.g., as determined at step 226), with the estimated data volumes for the second set of time intervals (e.g., step 222). The network monitoring platform 104 may, for example, calculate differences between the estimated data volumes and the measured data volumes. If a difference between an estimated data volume and a measured data volume for a time interval is greater than a threshold, the network monitoring platform 104 may determine that the measured data volume is anomalous.

The network monitoring platform 104 may use a SD of SARIMA-modeled data volumes of outgoing data (e.g., data volumes based on the SARIMA model for the first and/or second set of time intervals) to determine the threshold. The threshold may be equal to or a multiple of the SD (e.g., the multiple may 1.5, 2, 3, or any other value).

Figure 3:
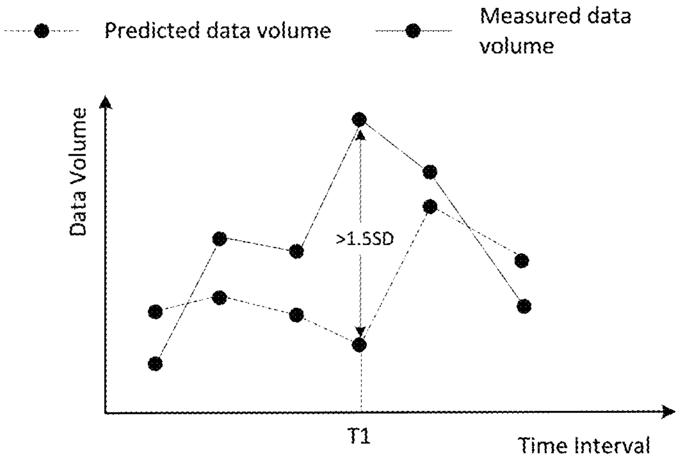
FIG. 3 shows an example comparison between predicted data volumes and measured data volumes for a set of time intervals, in accordance with one or more example arrangements.

FIG. 3 shows an example comparison between predicted data volumes and measured data volumes for the second set of time intervals. The network monitoring platform 104 may determine the differences between the predicted data volumes and measured data volumes and compare the differences with the threshold. With respect to FIG. 3, for example, a threshold value may be set as 1.5 times the SD of predicted data volumes. For a time interval time T1, the network monitoring platform 105 may determine that a difference between a measured data volume and a predicted data volume is greater than 1.5SD. As a result, the network monitoring platform may determine that the measured data volume is anomalous at a time interval T1.

At step 234, the network monitoring platform 104 may send one or more notifications to one or more devices in the private network 125 based on detection of anomalies at one or more time intervals. For example, the network monitoring platform may send a notification to the gateway 110 indicating that measured data volume(s) corresponding to the user device 102 is showing anomalies at the one or more time intervals. At step 238, and based on receiving the notification, the gateway 110 may block the user device 102 from communicating to the external network 130. For example, the gateway 110 may block any outgoing data traffic from the user device 102 to the external network 130.

Additionally or alternatively, the network monitoring platform 104 may send a notification to the administrative computing device 108 indicating that measured data volume (s) corresponding to the user device 102 is showing anomalies at the one or more time intervals. A user associated with the administrative computing device 108 may review the anomalies and determine to block the user device 102 from communicating to the external network 130. The administrative computing device 108 may send a notification to the gateway 110 to block traffic associated with the user device 102. The gateway 110 may block any outgoing data traffic from the user device 102 to the external network 130 based on receiving the notification.

One or more other operations may be performed in response to detections of anomalies in one or more time intervals. For example, the gateway 110 may send packet captures of data sent/received by the user device 102 to the network monitoring platform 104 for inspection. The network monitoring platform may initiate a scan of the user device 102 to detect malware or spyware potentially installed on the user device 102. The network monitoring platform 104 may initiate additional monitoring procedures for traffic associated with user device 102. For example, the network monitoring platform 104 may start inspecting data traffic from the user device 102. The network monitoring platform 104 may perform scanning and profile analysis of an external destination of traffic from the user device 102. The network monitoring platform 104 may sent a take-down request to an internet service provider (ISP) associated with the external destination of the traffic from the user device 102. The network monitoring platform 104 may reduce/revoke network access privileges for the user device 102. The network monitoring platform 104 may isolate the user device 102 from the public network 130. Any of these approaches may be based on manual review of activity associated with the user device 102 by a user associated with the administrative computing device 108.

The gateway 110 may control data traffic from the user devices 102 to the external network 130. The network monitoring platform 104 may analyze data traffic from the user devices 102 to the gateway 110 to determine the outgoing data volumes (e.g., at step 210 and 226). In another example arrangement, the network monitoring platform 104 may receive, from the user devices 102, respective indications of outgoing data volumes. In another example arrangement, the network monitoring platform 104 may receive, from the gateway 110, indications of outgoing data volumes corresponding to the user devices 102.

Determining threshold data volumes based on SARIMA models for each user device may reduce detection of false positives and false negatives in comparison with approaches that use a static threshold. For example, a first user device may, during normal operation, transmit large quantities of data (e.g., 500 MB per day) to the external network 130 while other user device may transmit smaller quantities (e.g., 10 MB per day). For example, the first user device may correspond to a data backup system that periodically sends large quantities large quantities of data to external systems via the external network 130, while the second user device may correspond to an individual user who may only use the external network 130 for light internet activities (e.g., sending/receiving emails). If a static threshold is used (e.g., 50 MB), the network monitoring platform 104 may flag the first user device as being associated with potentially malicious activity (false positive detection). If the second user device sends 30 MB of data during a particular day, the network monitoring platform 104 may ignore this (false negative) even though this is anomalous activity for the second user device. Generation of individualized SARIMA models of data volumes for each user device may enable the network monitoring platform 104 to account for the differences between network activities associated with different users/user devices and enable more accurate detection of anomalies.

Figure 4:
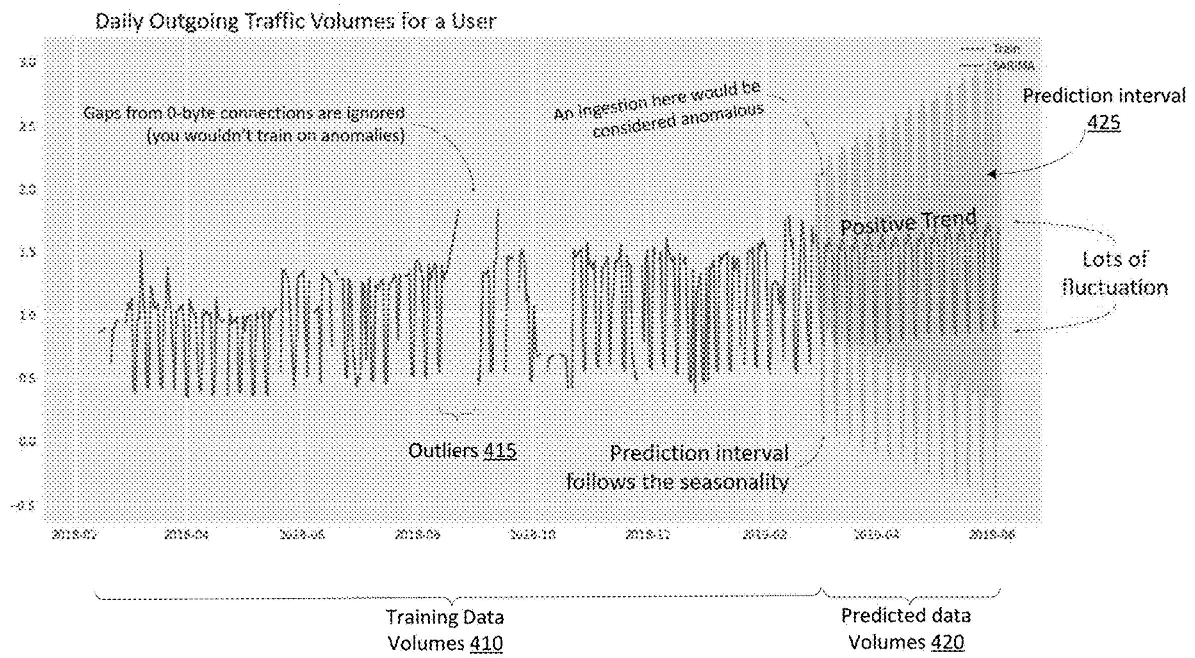
FIG. 4 shows an example graph of data volumes used to train a SARIMA model for a user device and predicted data volumes based on the SARIMA model, in accordance with one or more example arrangements.

FIG. 4 shows an example graph of data volumes used to train a SARIMA model for a user device 102 and predicted data volumes based on the SARIMA model. FIG. 4 shows an example embodiment in which a time interval of 1 day is used. The training data volumes 410 may correspond to data volumes determined for the first set of time intervals (e.g., step 210). The network monitoring platform 104 may not use outliers 415 within the training data volumes 410 where there is no connection between the user device 102 and the public network 130 (e.g., step 214). The network monitoring platform 104 may determine the SARIMA model based on the training data volumes 410. The network monitoring platform 104 may determine predicted data volumes 420 for the second set of time intervals (e.g., step 222) based on the SARIMA model. The network monitoring platform 104 may further determine a prediction interval based on a SD of the predicted data volumes 420. The prediction interval may correspond to a multiple of the SD (e.g., 1.5SD). A normal range of data volumes may be equal to (PV(T)±PI), where PV(T) may be equal to a predicted data volume at a time interval T and PI may be equal to a prediction interval. A measured data volume, for the time interval T, that is outside the normal range may be considered to be anomalous.

Figure 5:
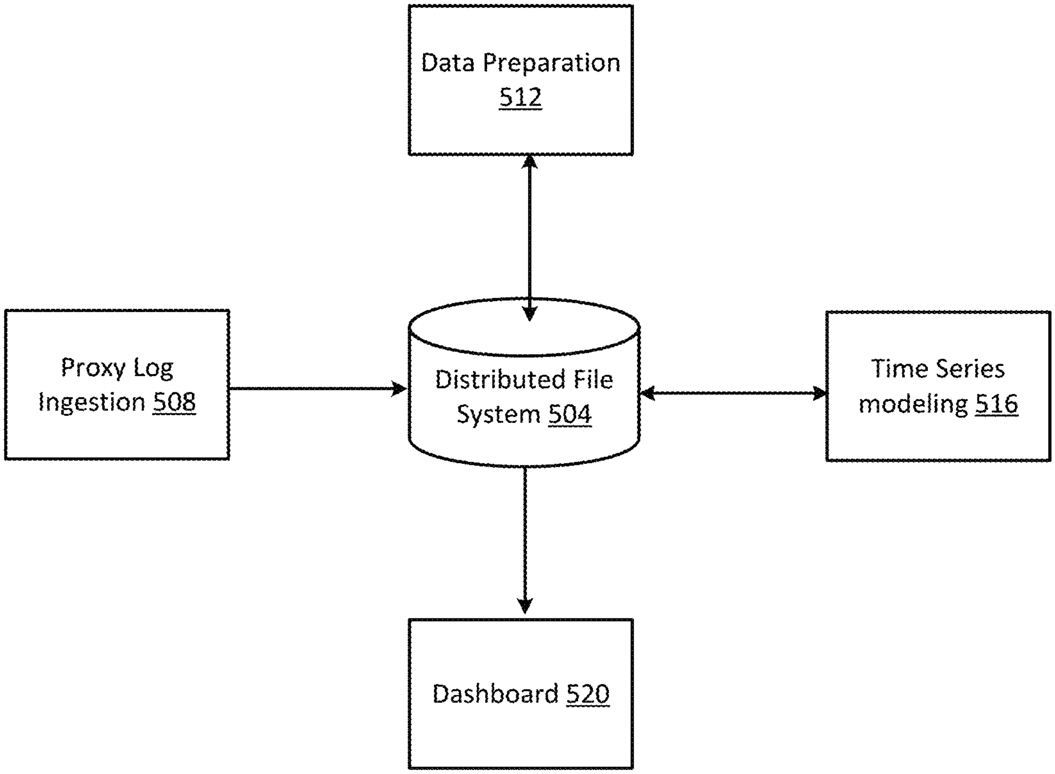
FIG. 5 shows an example block diagram with various modules that may be used by the network monitoring platform for detecting data exfiltration, in accordance with one or more example arrangements.

FIG. 5 shows an example block diagram with various modules that may be used by the network monitoring platform 104 for performing the steps of FIG. 2. A distributed file system 504 may store the determined/measure outgoing data volumes for a plurality of user device 102. A proxy log ingestion module 508 may be used to determine the outgoing data volumes. A data preparation module 512 may be used to remove outliers in training data volumes used for generation of the SARIMA models (e.g., as described with respect to step 218). A time series modeling module 516 may be used to generate the SARIMA models based on the training data. The dashboard module 520 may be used to present the determined anomalous data volumes (as determined at 230) to the administrative computing device 108. The various modules described with respect to FIG. 5 may correspond to hardware and/or software elements associated with the network monitoring platform 104. One or more of the modules may correspond to computing devices that may be associated with the private network 125.

Figure 6:
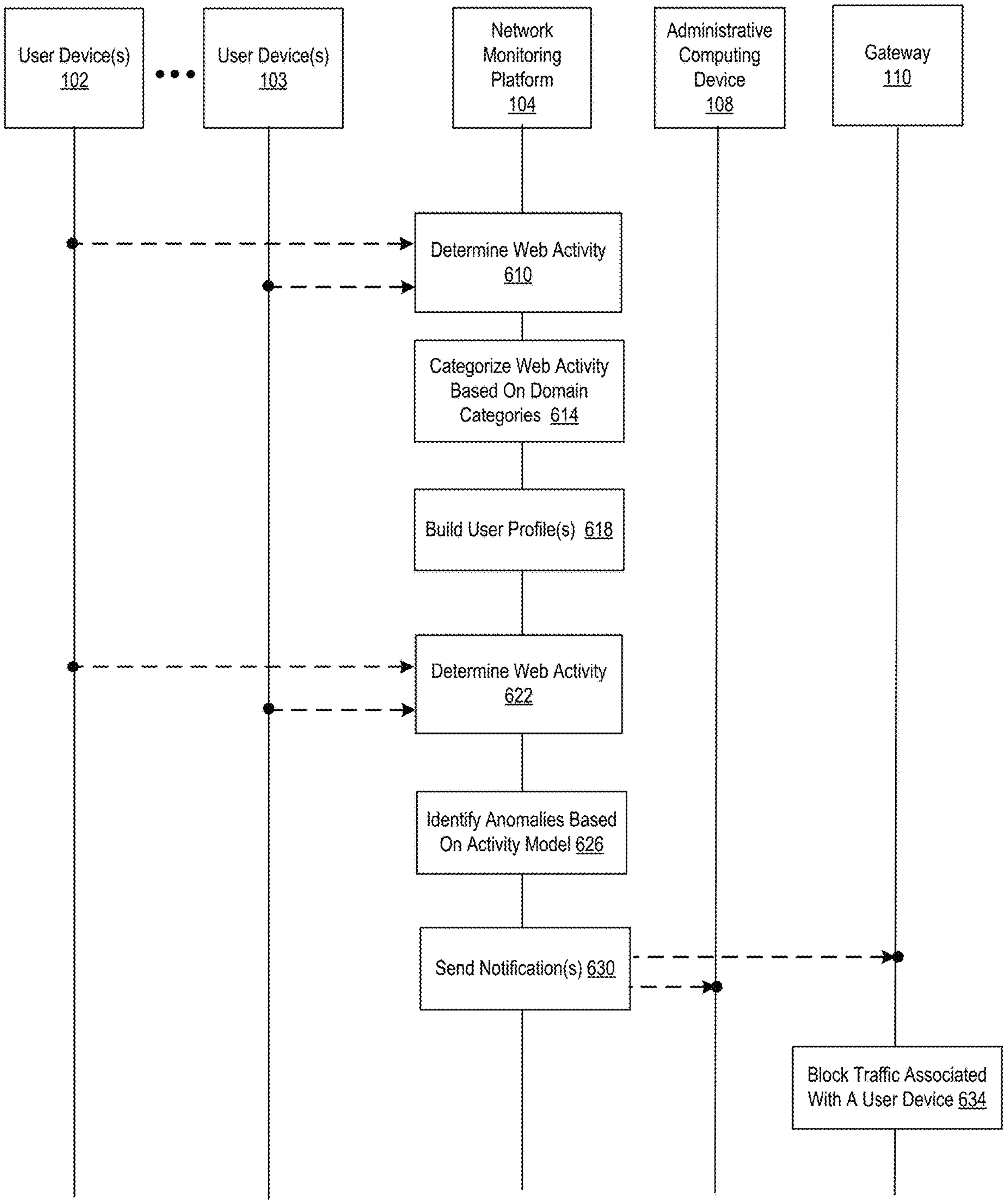
FIG. 6 shows an illustrative event sequence for detecting anomalies in internet browsing patterns of a user, in accordance with one or more example arrangements.

FIG. 6 shows an illustrative event sequence for detecting anomalies in internet browsing patterns of a user, in accordance with one or more example arrangements. At step 610, the network monitoring platform 104 may determine, for a first set of time intervals, web activities (e.g., internet browsing patterns) associated with each user device (e.g., user devices 102, user devices 103). A user device may be associated with the private network 125 corresponding to an enterprise organization or may be associated with the external network 130 (e.g., public network, such as Internet). The user device may be used for accessing content and/or services provided by device/servers in the computing network 100. The user corresponding to the user device may be associated with a user account. For example, the user account may be associated with an account used to access various databases and/or applications within the private network 125.

The network monitoring platform 104 may correspond to the enterprise organization which may monitor web activity associated with employees of the enterprise organization. The network monitoring platform 104 may correspond to an internet service provider (ISP) which may monitor web activity associated with clients of the ISP. The web activity associated with the user device may correspond to domains (e.g., web pages) requested by the user via the user device. The network monitoring platform 104 may monitor outgoing data from the user device to determine requests from the user device to access various domains. A time interval, in the first set of time intervals, may correspond to any period of time (e.g., 1 hour, 6, hours, 1 day, etc.). The network monitoring platform 104 may determine web activity corresponding to the user device for each time interval in the first set of time intervals.

At step 614, the network monitoring platform 104 may categorize/classify the web activity corresponding to user device (e.g., domains requested by the user device), for each time interval in the first set of time intervals, into a plurality of domain categories. For example, if a web page/domain requested by the user device corresponds to a news website, the network monitoring platform 104 may determine that the web page corresponds to a "news" category. As another example, if a web page/domain requested by the user device corresponds to a social media website, the network monitoring platform 104 may determine that the web page corresponds to a "social media" category. The network monitoring platform 104 may categorize the domain without inspecting the content of the domain. The network monitoring platform 104 may be associated with a database that maps domains (e.g., domain addresses) with associated domain categories. The network monitoring platform 104 may categorize the domains requested by the user device based on the mapping.

For each time interval, in the first set of time intervals, and for each domain category, the network monitoring platform 104 may determine a respective count. A count may be equal to a quantity of "hits"/requests for access to domains associated with a domain category in a time interval. For example, for a first time interval in the first set of time intervals, the network monitoring platform 104 may determine respective counts associated with respective domain categories as accessed by the user device. For example, for the first time interval, the network monitoring platform may determine that a count for the "news" category is 85 (e.g., 85 web pages associated with news websites were requested by the user device in the first time interval) while the count for the "social media" category is 0 (e.g., no web pages associated with social media websites were requested by the user device in the first time interval).

Web activity information (e.g., indications of domains requested by the user) may be provided by the gateway 110, for example, if the user device is associated with the private network 125 and the network monitoring platform 104 is monitoring network activity (e.g., outgoing data) of user devices 102 connected to the private network. Web activity information may be provided/sent by a server associated with an ISP, for example, if the user device is associated with a public network (e.g., Internet). Web activity information may be determined by a browser extension associated with a web browser of the user device (or any other local application associated with the user device) and sent by the user device to the network monitoring platform 104.

At step 618, and based on the web activity for each time interval in the first set of time intervals, the network monitoring platform 104 may build a user profile for the user device. The user profile may comprise, for each domain category, a corresponding statistical model. A statistical model for a domain category may comprise a corresponding average value of counts per time interval for the first set of time intervals. The statistical model for a domain category may comprise a corresponding SD of counts for the first set of time intervals. The statistical model for a domain category may comprise a corresponding interquartile range of counts for the first set of time intervals. Based on the statistical model of a domain category, the network monitoring platform 104 may determine an expected/predicted range of a count for the domain category and/or a threshold count for the domain category. An expected/predicted range of a count for a domain category may correspond to (average value per time interval±nSD), wherein n is any multiple. An expected range of a count for a domain category may correspond to an interquartile range of counts for the domain category in the first set of time intervals. A threshold count for a domain category may correspond to (average value per time interval±nSD), wherein n is any multiple.

In an example arrangement, the statistical model may comprise a time-series model (e.g., as described with respect to FIG. 2) of counts for the domain category. Building the statistical model may comprise determining hyperparameters for the time series model based on web activity in the first set of time intervals. Based on the time-series model the network monitoring platform 104 may determine an expected/predicted range of a count for the domain category for a future time interval. An expected/predicted range of a count for a domain category may correspond to (predicted value for the time interval±nSD).

At step 622, the network monitoring platform 104 may determine, for a time interval (e.g., following the first set of time intervals), web activity associated with the user device. Similar to step 614, the network monitoring platform 104 may categorize the web activity corresponding to user device, for the time interval, into a plurality of domain categories. The network monitoring platform 104 may further determine counts (e.g., quantity of requests for domains associated with a domain category) for each of the domain categories in the time interval based on the web activity (e.g., as described with reference to step 614).

At step 628, the network monitoring platform 104 identify anomalies in counts determined at step 622 for the time interval. The network monitoring platform 104 may compare a determined count for a domain category with the threshold count for the domain category. The network monitoring platform 104 may determine that the count for the domain category is anomalous if the count exceeds the threshold count. The network monitoring platform 104 may compare a determined count for a domain category with the interquartile range of counts for the domain category. The network monitoring platform 104 may determine that the count for the domain category is anomalous if the count is outside the interquartile range for the domain category. The network monitoring platform 104 may compare a determined count for a domain category with the expected range of counts for the domain category. The network monitoring platform 104 may determine that the count for the domain category is anomalous if the count is outside the expected range for the domain category.

Figure 7:
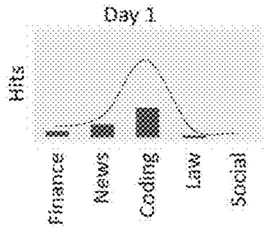
FIG. 7 shows example categorization of web activity for two time intervals, in accordance with one or more example arrangements.
Figure 7:
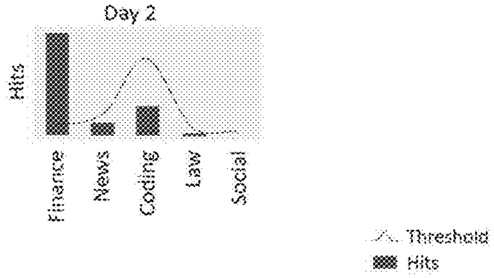

FIG. 7 shows example categorization of web activity for two different days (e.g. a time interval is equal to one day). Web activity associated with a user may be categorized into 5 categories. The network monitoring platform may determine a quantity of requests (count) for domains associated with each category and compare it with a threshold for the category. Thresholds for each of the categories may be determined based on the user profile as determined at step 618. For example, for day 1, all counts for the categories are below the threshold. However, for day 2, a count for the "finance" category is found to exceed a threshold for the category. This may be flagged as an anomaly for the user/user device (e.g., step 628).

A count that is outside an expected range of counts for the domain category as determined at step 618 may be flagged as anomaly. The network monitoring platform 104 may determine an anomaly score for the user/user device based on a quantity of categories that are showing anomalies. For example, a higher anomaly score may be assigned to a user/user device if a larger number of categories are showing anomalies in counts. An anomaly score may be directly proportional to a quantity of categories showing anomalies.

The network monitoring platform 104 may further determine anomaly scores for each domain category. An anomaly score may be proportional to a difference between a determined count for the domain category and the threshold count for the domain category. An anomaly score may be proportional to a difference between a determined count for the domain category and the upper/lower limit of an interquartile range (or expected range) of counts for the domain category.

The network monitoring platform 104 may update the user profile (e.g., as described with respect to step 618) based on the web activity determined at step 622. The network monitoring platform 104 may update the user profile based on the web activity determined at step 622, for example, if no anomalies are identified for the time interval (e.g., at step 628).

At step 630, the network monitoring platform 104 may send one or more notifications to one or more devices in the private network 125 based on detection of an anomaly at step 626. For example, the network monitoring platform 104 may send a notification to the gateway 110 indicating that an anomaly was detected at the user device. At step 634, and based on receiving the notification, the gateway 110 may block the user device from communicating via the interval network 125 and/or the external network 130. For example, the gateway 110 may block any outgoing data traffic from the user device 102 to the external network 130. The network monitoring platform 104 may send one or more notifications to a server associated with the ISP based on detection of an anomaly at step 626. The server may block requests from the user device to access a network. The network monitoring platform 104 may send one or more notifications to the user device based on detection of an anomaly at step 626. The browser extension associated with a web browser of the user device may disconnect the user device from the network (e.g., deactivate a modem).

Additionally or alternatively, the network monitoring platform 104 may send a notification to the administrative computing device 108 indicating that an anomaly was detected at the user device. A user associated with the administrative computing device 108 may review the anomaly and determine to block the user device 102 from communicating via the interval network 125 and/or the external network 130. The administrative computing device 108 may send a notification to the gateway 110 to block traffic associated with the user device 102. One or more of the steps described with respect to step 630 may be performed based on an anomaly score. For example, the network monitoring platform 104 may send a notification to the administrative computing device 108 if an anomaly score is below a threshold score. However, the network monitoring platform 104 may send a notification to the gateway 110/server associated with the ISP to block traffic from the user device if an anomaly score is greater than or equal to a threshold score.

Figure 8:
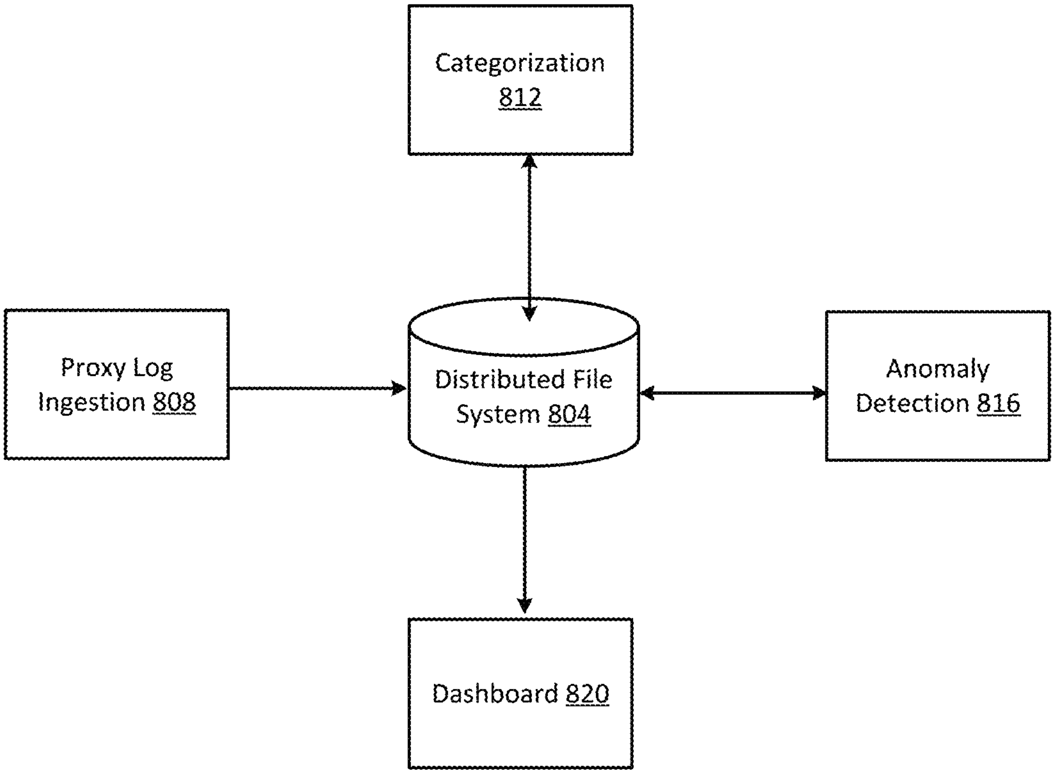
FIG. 8 shows an example block diagram with various modules that may be used by the network monitoring platform for detecting anomalous browsing patterns, in accordance with one or more example arrangements.

FIG. 8 shows an example block diagram with various modules that may be used by the network monitoring platform 104 for detecting anomalous browsing patterns. A distributed file system 804 may store a listing of domains as requested by a plurality of user devices as well as generated user profiles based on domain categorization. A proxy log ingestion module 808 may be used to determine domains requested by the user devices. A categorization module 812 may be used to categorize the domains into domain categories. The dashboard module 520 may be used to present the determined anomalies (as determined at 626) to the administrative computing device 108. The various modules described with respect to FIG. 5 may correspond to hardware and/or software elements associated with the network monitoring platform 104, or in communication with the network monitoring platform 104 via the private network 125 and/or public network 130. One or more of the modules may correspond to computing devices that may be associated with the private network 125.

Various examples described herein may enable efficient detection of anomalies in user browsing patterns by the use of domain categorization and without content inspection. Detection of anomalies in user browsing patterns may enable detection of malicious activity (e.g., data exfiltration, unauthorized financial transactions, etc.). The domain categorization approach may be flexibly applied for detecting compromised user accounts/devices in both private and public networks.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A network monitoring platform comprising:

a processor, a communication interface communicatively coupled to the processor; and one or more memories comprising a user profile database and storing computer-readable instructions that, when executed by the processor, cause the network monitoring platform to:

monitor outgoing data, associated with a plurality of domain categories, from a user device to an external network;

count, in the outgoing data and in a first time period, respective actual quantities of requests, by the user device, to each of the plurality of domain categories;

predict, based on a user profile in the user profile database and associated with the user device, respective expected quantities of requests, by the user device, to each of the plurality of domain categories in the first time period;

identify the outgoing data as anomalous based on a distribution of the expected quantities of requests and a distribution of the actual quantities of requests associated with the plurality of domain categories; and send, via the communication interface and based on the identifying the outgoing data as anomalous, a notification.

2. The network monitoring platform of claim 1, wherein the instructions, when executed by the processor, cause the network monitoring platform to:

classify requests in the outgoing data from the user device to the external network into one of the plurality of domain categories, wherein the outgoing data extends for a plurality of time periods prior to the first time period;

build a statistical model based on the classifying of the requests, wherein the statistical model comprises at least one of: an average quantity of requests per time period, a standard deviation of a quantity of requests per time period, an interquartile range of a quantity of requests per time period, or a combination thereof; and update the user profile associated with the user device based on the statistical model.

3. The network monitoring platform of claim 2, wherein the instructions, when executed by the processor, cause the network monitoring platform to build the statistical model by causing:

for the plurality of time periods, monitoring Internet website browsing patterns of a user of the user device by domain category without inspecting webpage content, and calculating, for each of the plurality of time periods, respective actual quantities of requests to each of the plurality of domain categories.

4. The network monitoring platform of claim 2, wherein the instructions, when executed by the processor, cause the network monitoring platform to build the statistical model by causing determining one or more hyperparameters of the statistical model that result in a best fit.

5. The network monitoring platform of claim 1, wherein the plurality of domain categories comprises one or more of: news, law, finance, or social media.

6. The network monitoring platform of claim 1, wherein the requests in the outgoing data from the user device represents Internet website browsing patterns of a user of the user device.

7. The network monitoring platform of claim 1, wherein the instructions, when executed by the processor, cause the network monitoring platform to:

identify the outgoing data as anomalous by causing determining an anomaly score, wherein the anomaly score is based on a difference between the respective expected quantities of requests and the respective actual quantities of requests; and send the notification by causing sending the notification based on the anomaly score exceeding a threshold score.

8. The network monitoring platform of claim 1, wherein the instructions, when executed by the processor, cause the network monitoring platform to send the notification by causing sending the notification to a gateway server associated with the user device, wherein the notification comprises an indication to disconnect the user device from the external network.

9. The network monitoring platform of claim 1, wherein the instructions, when executed by the processor, cause the network monitoring platform to identify the outgoing data as anomalous by causing identifying the outgoing data as anomalous further based on at least one of a deviation from a mean, a deviation exceeding a multiple of a standard deviation, or a deviation from an upper or lower limit of an interquartile range.

10. A method comprising:

monitoring outgoing data, associated with a plurality of domain categories, from a user device to an external network;

counting, in the outgoing data and in a first time period, respective actual quantities of requests, by the user device, to each of the plurality of domain categories;

predicting, based on a user profile in a user profile database and associated with the user device, respective expected quantities of requests, by the user device, to each of the plurality of domain categories in the first time period;

identifying the outgoing data as anomalous based on a distribution of the expected quantities of requests and a distribution of the actual quantities of requests associated with the plurality of domain categories; and sending, based on the identifying the outgoing data as anomalous, a notification.

11. The method of claim 10, further comprising:

classifying requests in the outgoing data from the user device to the external network into one of the plurality of domain categories, wherein the outgoing data extends for a plurality of time periods prior to the first time period;

building a statistical model based on the classifying of the requests, wherein the statistical model comprises at least one of: an average quantity of requests per time period, a standard deviation of a quantity of requests per time period, an interquartile range of a quantity of requests per time period, or a combination thereof; and updating the user profile associated with the user device based on the statistical model.

12. The method of claim 11, wherein the building the statistical model comprises:

for the plurality of time periods, monitoring Internet website browsing patterns of a user of the user device by domain category without inspecting webpage content, and calculating, for each of the plurality of time periods, respective actual quantities of requests to each of the plurality of domain categories.

13. The method of claim 12, wherein the building the statistical model comprises determining one or more hyperparameters of the statistical model that result in a best fit.

14. The method of claim 10, wherein the plurality of domain categories comprises one or more of: news, law, finance, or social media.

15. The method of claim 10, wherein the requests in the outgoing data from the user device represents Internet website browsing patterns of a user of the user device.

16. The method of claim 10, wherein:

the identifying the outgoing data as anomalous comprises determining an anomaly score, wherein the anomaly score is based on a difference between the respective expected quantities of requests and the respective actual quantities of requests; and the sending the notification comprises sending the notification based on the anomaly score exceeding a threshold score.

17. The method of claim 10, wherein the sending the notification comprises sending the notification to a gateway server associated with the user device, wherein the notification comprises an indication to disconnect the user device from the external network.

18. The method of claim 10, wherein the identifying the outgoing data as anomalous comprises identifying the outgoing data as anomalous further based on at least one of a deviation from a mean, a deviation exceeding a multiple of a standard deviation, or a deviation from an upper or lower limit of an interquartile range.

19. A non-transitory computer readable medium storing computer executable instructions that, when executed by a processor, cause a network monitoring platform to:

monitor outgoing data, associated with a plurality of domain categories, from a user device to an external network;

count, in the outgoing data and in a first time period, respective actual quantities of requests, by the user device, to each of the plurality of domain categories;

predict, based on a user profile in a user profile database and associated with the user device, respective expected quantities of requests, by the user device, to each of the plurality of domain categories in the first time period;

identify the outgoing data as anomalous based on a distribution of the expected quantities of requests and a distribution of the actual quantities of requests associated with the plurality of domain categories; and send, based on the identifying the outgoing data as anomalous, a notification.

20. The non-transitory computer readable medium of claim 19, wherein the instructions, when executed by the processor, cause the network monitoring platform to:

classify requests in the outgoing data from the user device to the external network into one of the plurality of domain categories, wherein the outgoing data extends for a plurality of time periods prior to the first time period;

build a statistical model based on the classifying of the requests, wherein the statistical model comprises at least one of: an average quantity of requests per time period, a standard deviation of a quantity of requests per time period, an interquartile range of a quantity of requests per time period, or a combination thereof; and update the user profile associated with the user device based on the statistical model.

* * * * *